United States Patent
Kim et al.

(10) Patent No.: US 11,801,746 B2
(45) Date of Patent: Oct. 31, 2023

(54) APPARATUS FOR CONTROLLING SHUT-OFF OF FUEL GUN IN FILLER PIPE OF FUEL TANK

(71) Applicants: HYUNDAI MOTOR COMPANY, Seoul (KR); KIA CORPORATION, Seoul (KR)

(72) Inventors: Keun Soo Kim, Yongin-si (KR); Jung Hoon Park, Suwon-si (KR); Dong Hyun Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 330 days.

(21) Appl. No.: 17/342,759

(22) Filed: Jun. 9, 2021

(65) Prior Publication Data

US 2022/0089018 A1    Mar. 24, 2022

(30) Foreign Application Priority Data

Sep. 23, 2020  (KR) .......................... 10-2020-0122814

(51) Int. Cl.
*B60K 15/035* (2006.01)
*B60K 15/04* (2006.01)
*B60K 15/03* (2006.01)

(52) U.S. Cl.
CPC ........ *B60K 15/03519* (2013.01); *B60K 15/04* (2013.01); *B60K 2015/03368* (2013.01);
(Continued)

(58) Field of Classification Search
CPC ... F16L 37/40; A61M 39/10; B60K 15/03519; B60K 15/04; B60K 2015/03538; B60K 2015/03335
See application file for complete search history.

(56) References Cited

U.S. PATENT DOCUMENTS

| 4,768,566 A | * | 9/1988 | Ito ......................... B60K 15/04 141/285 |
| 4,836,835 A | * | 6/1989 | Harris .................... B60K 15/04 96/174 |

(Continued)

FOREIGN PATENT DOCUMENTS

| JP | 6319547 B2 | 5/2018 |
| KR | 10-0387712 B1 | 6/2003 |

(Continued)

*Primary Examiner* — Patrick C Williams
(74) *Attorney, Agent, or Firm* — LEMPIA SUMMERFIELD KATZ LLC

(57) ABSTRACT

Disclosed is an apparatus for controlling shut-off of a fuel gun in a filler pipe of a fuel tank which inhibits early shut-off of the fuel gun before the fuel tank is fully filled with fuel while refueling. The apparatus includes: a retainer mounted in a filler neck of the fuel tank; a partition disposed in a space between an inner circumferential surface of the filler neck and an outer circumferential surface of the retainer and having a fuel intake hole formed in a lower end of the partition; and an early shut-off prevention valve disposed in the partition. The early shut-off prevention valve closes the fuel intake hole before the fuel tank is fully filled with fuel, and opens the fuel intake hole by fuel flowing to the filler neck from the fuel tank when the fuel tank is fully filled with the fuel.

13 Claims, 4 Drawing Sheets

(52) U.S. Cl.
CPC ............... *B60K 2015/03538* (2013.01); *B60K 2015/0477* (2013.01)

(56) References Cited

U.S. PATENT DOCUMENTS

| | | | | |
|---|---|---|---|---|
| 5,056,570 A * | 10/1991 | Harris | ............... | B60K 15/03519 141/351 |
| 5,730,194 A * | 3/1998 | Foltz | ...................... | B60K 15/04 141/308 |
| 5,947,153 A * | 9/1999 | Bucci | ..................... | B60K 15/04 141/59 |
| 5,960,839 A * | 10/1999 | Armesto | ................ | B60K 15/04 141/304 |
| 6,923,224 B1 * | 8/2005 | McClung | ............. | B60K 15/035 220/86.2 |
| 7,673,659 B2 * | 3/2010 | Burkholder | ........... | B63B 25/082 141/206 |
| 7,757,729 B2 * | 7/2010 | Smith | ................... | B63B 25/082 141/206 |
| 7,779,820 B2 * | 8/2010 | Rittershofer | ..... | B60K 15/03519 123/518 |

FOREIGN PATENT DOCUMENTS

| | | |
|---|---|---|
| KR | 10-0428102 B1 | 4/2004 |
| KR | 10-1491390 B1 | 2/2015 |

\* cited by examiner

APPARATUS FOR CONTROLLING SHUT-OFF OF FUEL GUN IN FILLER PIPE OF FUEL TANK

CROSS-REFERENCE TO RELATED APPLICATION

This application claims priority to and the benefit of Korean Patent Application No. 10-2020-0122814, filed on Sep. 23, 2020, the entire contents of which are incorporated herein by reference.

FIELD

The present disclosure relates to an apparatus for controlling shut-off of a fuel gun in a filler pipe of a fuel tank.

BACKGROUND

The statements in this section merely provide background information related to the present disclosure and may not constitute prior art.

In general, a fuel gun used to fill a fuel tank of a vehicle with fuel is configured to discharge the fuel when a lever is pulled and then to stop discharge of the fuel when the fuel tank is fully filled with the fuel.

The fuel gun senses the fully filled state of the fuel tank using negative pressure formed in the fuel gun when the fuel gun discharges the fuel. The fuel gun releases the negative pressure through air introduced thereinto through a venturi port before the fuel tank is fully filled with fuel, and forms the negative pressure by closing the venturi port when the fuel tank is fully filled with the fuel and thereby senses the fully filled state of the fuel tank.

When the fuel tank is fully filled with the fuel, the fuel flowing backwards through a filler pipe of the fuel tank closes the venturi port, and thereby, air inflow through the venturi port is stopped, the negative pressure in the fuel gun is not released anymore, and thus the fuel gun is shut off.

If the fuel tank is filled with the fuel under normal conditions, the fuel gun continuously draws air through the venturi port before the fuel gun is shut-off. At this time, the fuel gun draws fuel evaporation gas, discharged to the filler pipe through a leveling pipe of the fuel tank, through the venturi port, but the amount of the fuel evaporation gas discharged to the filler pipe is not great and thus the fuel gun is not shut off before the fuel tank is fully filled with fuel.

However, we have discovered that if the fuel tank is filled with the fuel under high-temperature conditions, an excessive amount of the fuel evaporation gas discharged to the filler pipe through the leveling pipe of the fuel tank is condensed within the venturi port having a relatively low temperature and thus prevents inflow of air, and thereby, the negative pressure in the fuel gun is not released and thus the fuel gun is early shut off before the fuel tank is fully filled with the fuel.

The above-described early shut-off of the fuel gun frequently occurs when the fuel tank is filled with the fuel under high-temperature conditions, and the fuel tank may be difficult to be filled with the fuel when the temperature of the fuel tank is excessively high.

The above information disclosed in this Background section is only for enhancement of understanding of the background of the present disclosure and therefore it may contain information that does not form the prior art that is already known to a person of ordinary skill in the art.

SUMMARY

The present disclosure provides an apparatus for controlling shut-off of a fuel gun in a filler pipe of a fuel tank which inhibits or prevents shut-off of the fuel gun before the fuel tank is fully filled with fuel.

In one aspect of the present disclosure, an apparatus for controlling shut-off of a fuel gun in a filler pipe of a fuel tank includes: a retainer mounted in a filler neck of the fuel tank, and having external air intake holes configured to draw external air and evaporation gas venting holes configured to discharge fuel evaporation gas, the external air intake hole and the evaporation gas venting holes being formed in an upper portion of the retainer based on a fuel injection direction of the filler neck, and an opening formed in a lower portion of the retainer, configured to fluidly communicate with the external air intake holes such that fluid may flow therebetween, and disposed outside a fuel discharge part of the fuel gun inserted into the filler neck to open a venturi port of the fuel discharge part, a partition disposed on an outer circumferential surface of the retainer to surround a first space configured to communicate with the opening and the external air intake holes such that the fluid may flow therebetween, among a space between an inner circumferential surface of the filler neck and the outer circumferential surface of the retainer, and having a fuel intake hole formed in a lower end of the partition, and an early shut-off prevention valve disposed in the partition and configured to close the fuel intake hole before the fuel tank is fully filled with fuel and to open the fuel intake hole due to the fuel flowing to the filler neck from the fuel tank when the fuel tank is fully filled with the fuel.

In another form, the partition may divide the space between the inner circumferential surface of the filler neck and the outer circumferential surface of the retainer into the first space and a second space. The second space may be configured to communicate with the evaporation gas venting holes such that the fluid may flow therebetween, among the space between the inner circumferential surface of the filler neck and the outer circumferential surface of the retainer. The partition may be configured to seal the first space other than the fuel intake hole.

In another form, a spring support plate may be mounted on an inner circumferential surface of the partition, and a spring member configured to press the early shut-off prevention valve towards the fuel intake hole may be disposed between the spring support plate and the early shut-off prevention valve.

In still another form, a valve engagement protrusion configured to support the early shut-off prevention valve may be provided at a lower end of the partition.

In yet another form, the spring member may press the early shut-off prevention valve against the valve engagement protrusion to maintain a state in which the early shut-off prevention valve closes the fuel intake hole before the spring member is compressed by the fuel flowing backwards from the fuel tank when the fuel tank is fully filled with the fuel.

In still yet another form, the spring member may be compressed by the fuel flowing into the filler neck from the fuel tank when the fuel tank is fully filled with the fuel, and thus allow the early shut-off prevention valve to open the fuel intake hole.

In a further form, the retainer may have a fuel gun engagement protrusion provided at a lower end thereof, and the venturi port of the fuel discharge part may face the opening of the retainer when an end of the fuel discharge part of the fuel gun comes into contact with the fuel gun engagement protrusion.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
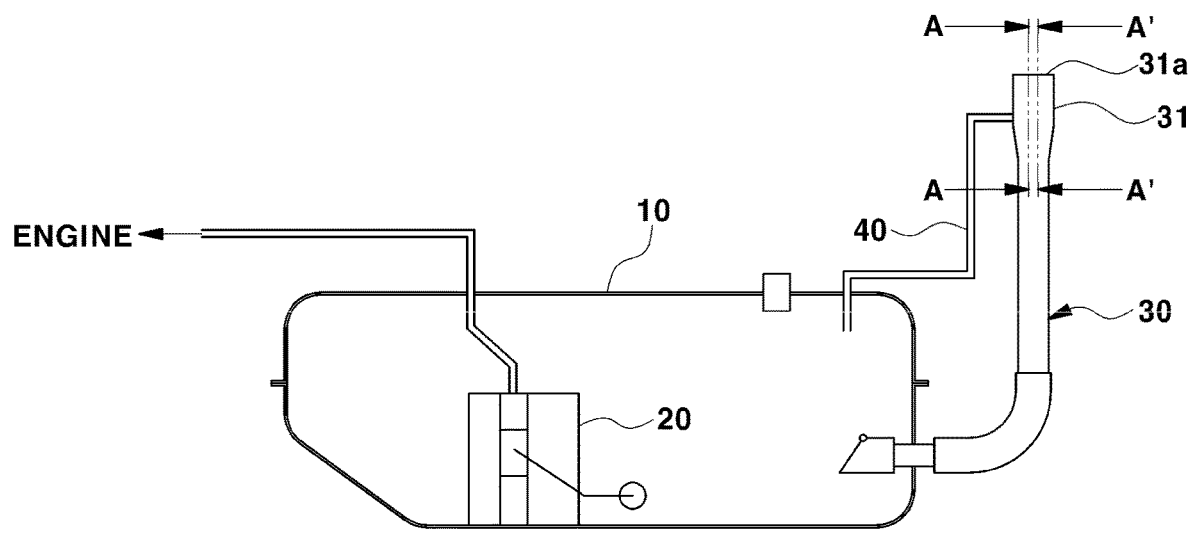
FIG. 1 is a view illustrating the configuration of a fuel system for vehicles to which an apparatus for controlling shut-off of a fuel gun in a filler pipe of a fuel tank according to one form of present disclosure is applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter reference will be made in detail to various forms of the present disclosure, examples of which are illustrated in the accompanying drawings and described below. While the present disclosure will be described in conjunction with exemplary forms, it will be understood that the present description is not intended to limit the present disclosure to the exemplary forms. On the contrary, the present disclosure is intended to cover not only the exemplary forms, but also various alternatives, modifications, equivalents and other forms, which may be within the spirit and scope of the present disclosure. The details of the accompanying drawings are illustrated to merely explain the forms of the present disclosure, and may be different from the actually implemented forms.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

In the following description of the forms, it will be understood that, when a part is said to "include" an element, the part may further include other elements, and does not exclude the presence of other elements unless stated otherwise.

FIG. 1 is a view illustrating a portion of the configuration of a fuel system for vehicles to which an apparatus for controlling shut-off of a fuel gun in a filler pipe of a fuel tank according to one form of the present disclosure is applied.

As shown in FIG. 1, the fuel system for vehicles includes a fuel tank 10 configured to store fuel, a fuel pump 20 configured to pump the fuel in the fuel tank 10 to an engine, a filler pipe 30 configured to inject the fuel into the fuel tank 10, and a leveling pipe 40 configured to release the internal pressure of the fuel tank 10 while filling the fuel tank 10.

The leveling pipe 40 is connected to the fuel tank 10 and the filler pipe 30 such that fluid may flow therebetween, and thus functions to discharge fuel evaporation gas, generated in the fuel tank 10 while filling the fuel tank 10, to the filler pipe 30.

Here, the lower end of the leveling pipe 40 passes through the upper end of the fuel tank 10 and is disposed within the fuel tank 10, and when the fuel in the fuel tank 10 reaches a full level, the lower end of the leveling pipe 40 contacts the surface of the fuel and is thus closed.

When the leveling pipe 40 is closed while filling the fuel tank 10, the internal pressure of the fuel tank 10 is raised and thus the fuel in the fuel tank 10 flows backwards to the filler pipe 30, and the fuel flowing backwards to the filler pipe 30 causes shut-off of the fuel gun, thereby stopping discharge of the fuel from the fuel gun.

The leveling pipe 40 is connected to the upper portion of the filler pipe 30 such that fluid may flow therebetween, and the lower portion of the filler pipe 30 is connected to the fuel tank 10 such that fluid may flow therebetween.

Figure 5:
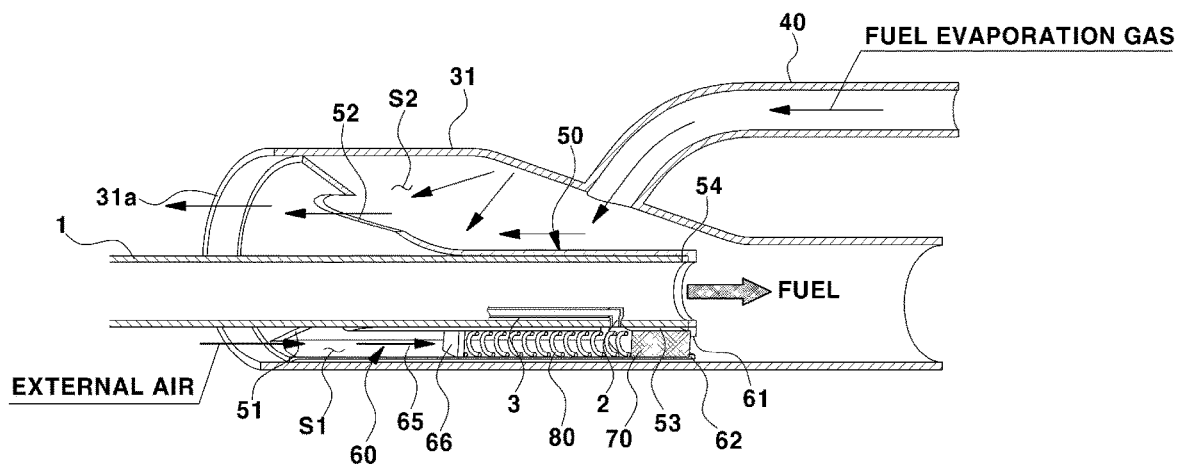
FIG. 5 is a view illustrating the operating state of the apparatus when the fuel tank is being filled with fuel under room-temperature conditions.
Figure 6:
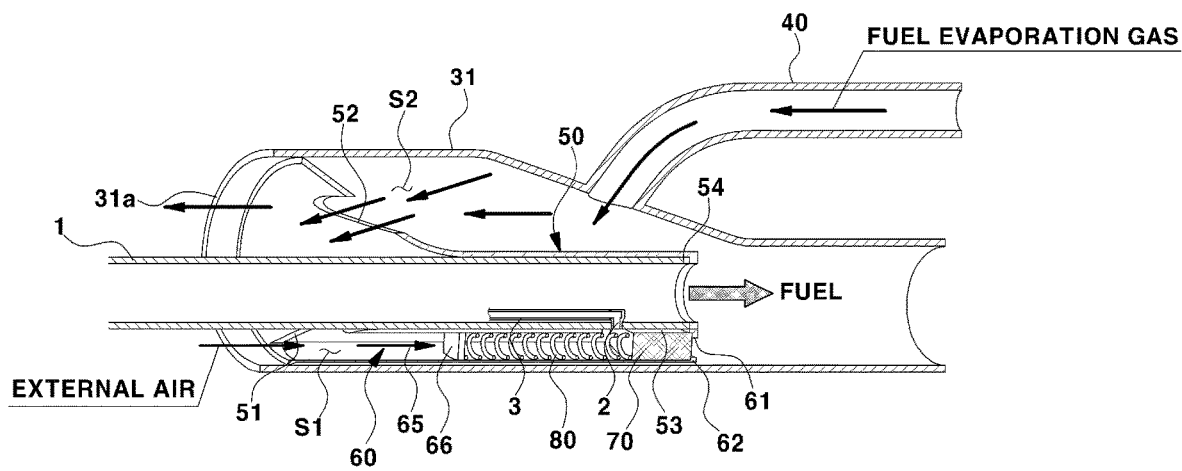
FIG. 6 is a view illustrating the operating state of the apparatus when the fuel tank is being filled with the fuel under high-temperature conditions.
Figure 7:
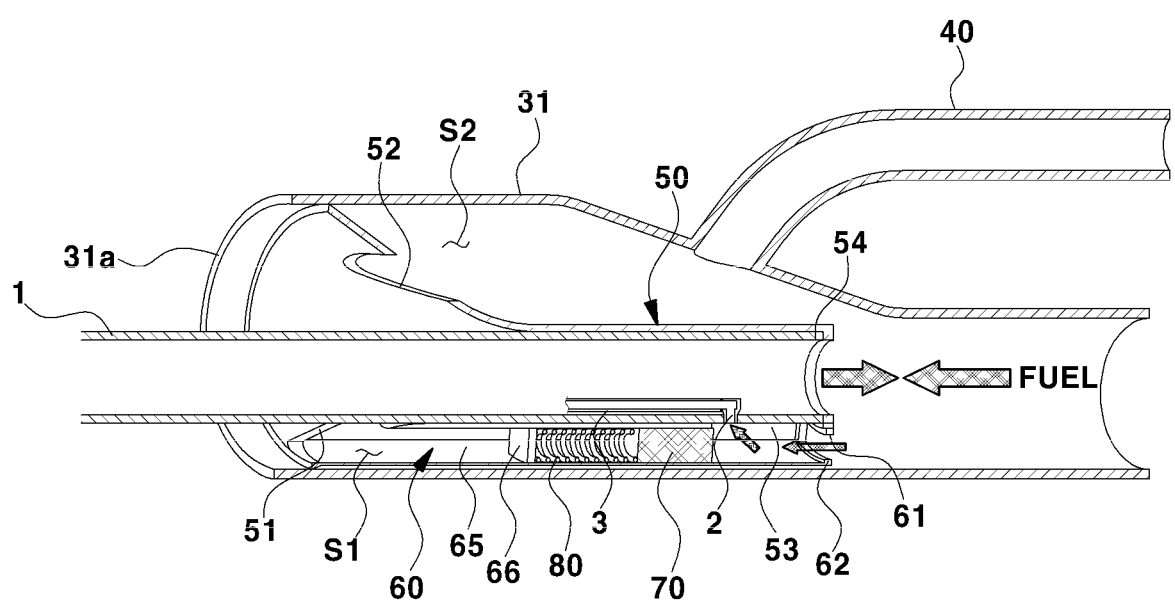
FIG. 7 is a view illustrating the operating state of the apparatus when the fuel tank is fully filled with the fuel.

As shown in FIGS. 5 to 7, a fuel discharge part 1 of the fuel gun is inserted into a filler neck 31 while filling the fuel tank 10, and the filler neck 31 corresponds to the upper portion of the filler pipe 30. That is, the filler neck 31 is a part into which the fuel discharge part 1 of the fuel gun is inserted and which communicates with the leveling pipe 40.

When the fuel is injected into the fuel tank 10, the fuel evaporation gas discharged through the leveling pipe 40 may be discharged to the outside through the filler neck 31.

In general, while filling the fuel tank 10 at room temperature, the fuel gun continuously draws air through a venturi port 2 provided in the fuel discharge part 1 before the fuel gun is shut off. Here, the fuel gun may also draw the fuel evaporation gas discharged to the filler neck 31, but the amount of the fuel evaporation gas discharged to the filler neck 31 is small and thus earlier shut-off of the fuel gun does not occur.

As shown in FIG. 5, the venturi port 2 configured to draw external force due to internal pressure of the fuel gun when discharging the fuel is formed in the fuel discharge part 1 of the fuel gun, and a venturi port connection pipe 3 disposed to extend towards the inside of the fuel discharge part 1 is provided in the venturi port 2.

Before the fuel tank 10 is fully filled with the fuel, the negative pressure formed in the fuel gun is released by drawing external air into the fuel gun through the venturi port 2, and thereby, shut-off of the fuel gun is prevented. When the fuel tank 10 is fully filled with the fuel, the venturi port 2 is closed by the fuel flowing backwards to the filler neck 31, and thus, the negative pressure formed in the fuel gun is not released through the venturi port 2 and the fuel gun senses the fully filled state of the fuel tank 10 and stops discharge of the fuel.

However, while the fuel tank 10 is filled with the fuel under conditions in which an excessive amount of the fuel evaporation gas is generated in the fuel tank 10, the excessive amount of the fuel evaporation gas discharged to the filler neck 31 through the leveling pipe 40 flows to the inside of the venturi port connection pipe 3 having a relatively low temperature and is then condensed within the venturi port connection pipe 3, and thereby, drawing of air through the venturi port 2 is stopped, the negative pressure in the fuel gun is not released, and thus the fuel gun is early shut off before the fuel tank 10 is fully filled with the fuel.

Figure 2:
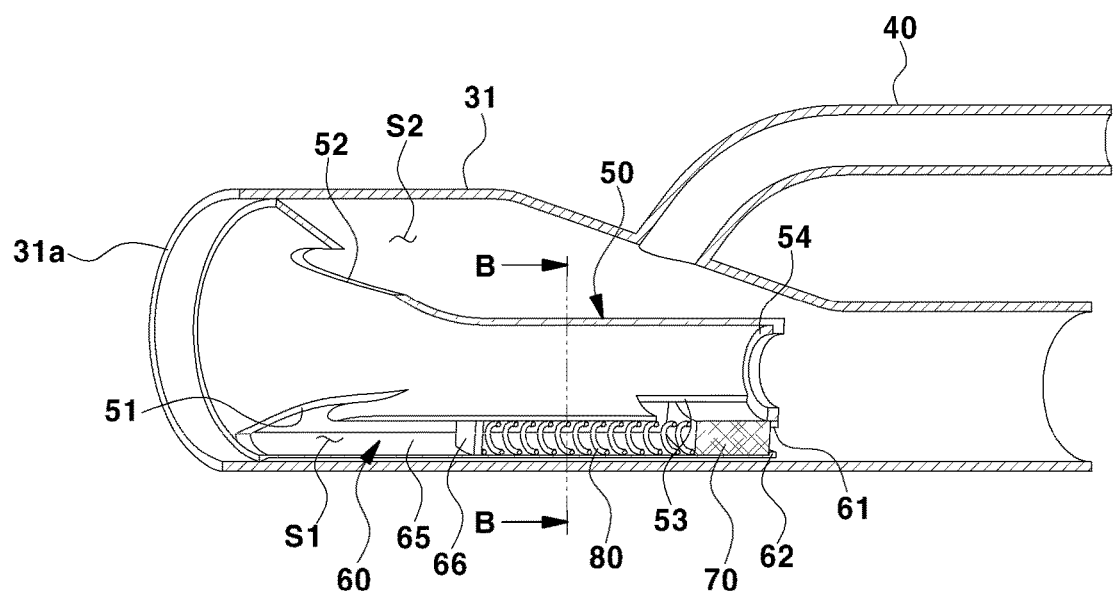
FIG. 2 is a cross-sectional view of the apparatus taken along line A-A of FIG. 1.
Figure 3:
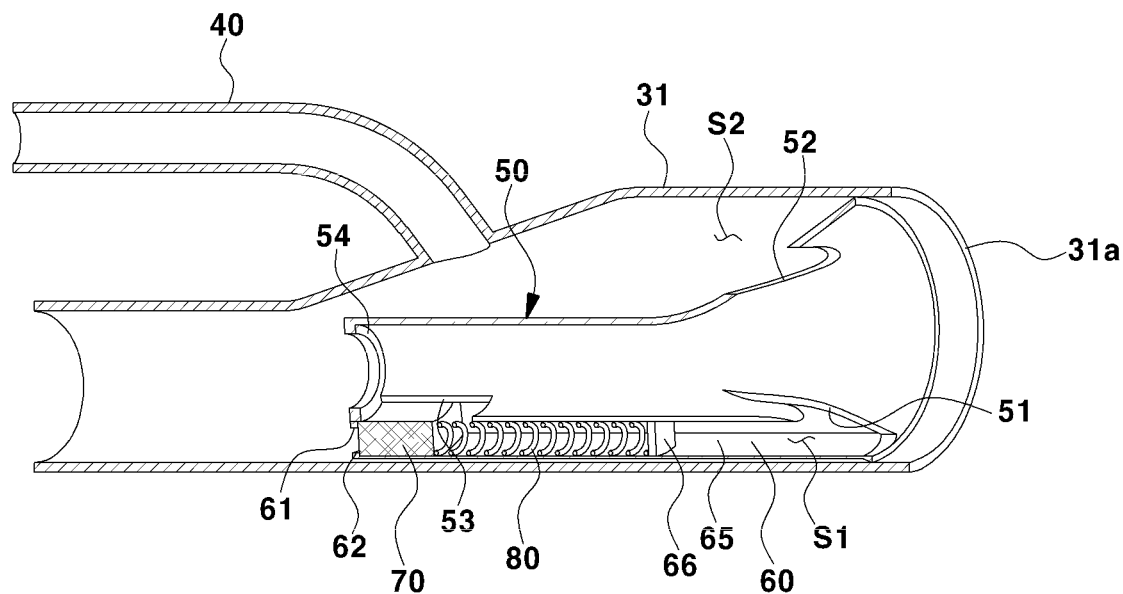
FIG. 3 is a cross-sectional view of the apparatus taken along line A'-A' of FIG. 1.
Figure 4:
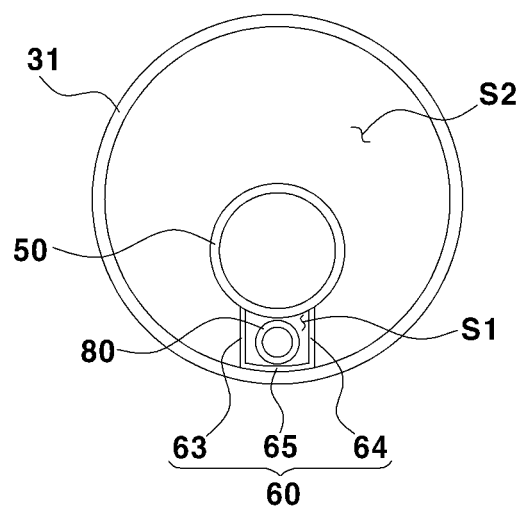
FIG. 4 is a cross-sectional view taken along line B-B of FIG. 2.

Therefore, the present disclosure provides the apparatus for controlling shut-off of the fuel gun configured to prevent early shut-off of the fuel gun in the filler neck 31, as shown in FIGS. 2 to 4.

The apparatus is configured to smoothly release the negative pressure in the fuel gun not only while filling the fuel tank 10 in room-temperature conditions but also while filling the fuel tank 10 in high-temperature conditions, thereby fundamentally preventing early shut-off of the fuel gun while filling the fuel tank 10 under high-temperature conditions.

While filling the fuel tank 10 under the high-temperature conditions, a much larger amount of the fuel evaporation gas may be generated in the fuel tank 10 than while filling the fuel tank 10 under room-temperature conditions. For example, a high temperature may be a temperature higher than room temperature by a designated value or more.

FIGS. 2 and 3 illustrate the apparatus according to one form of the present disclosure. Here, FIG. 2 is a cross-sectional view of the apparatus, taken along line A-A of FIG. 1, and FIG. 3 is a cross-sectional view of the apparatus, taken along line A'-A' of FIG. 1. Further, FIG. 4 is a cross-sectional view taken along line B-B of FIG. 2.

As shown in FIGS. 2 to 4, the apparatus includes a retainer 50, a partition 60 and an early shut-off prevention valve 70, which are disposed within the filler neck 31 of the fuel tank 10.

The retainer 50 is configured to fixedly support the fuel discharge part 1 of the fuel gun inserted into the filler neck 31, and is mounted in the filler neck 31 to be fixed.

In more detail, the retainer 50 may be formed in the shape of a pipe having a tapered upper portion and a lower portion having an inner diameter corresponding to the outer diameter of the fuel discharge part 1.

Since the lower portion of the retainer 50 has the inner diameter corresponding to the outer diameter of the fuel discharge part 1, the retainer 50 may hold the fuel discharge part 1 without moving when the fuel discharge part 1 of the fuel gun is inserted into the filler neck 31. Here, a fine gap may be formed between the inner circumferential surface of the retainer 50 and the outer circumferential surface of the fuel discharge part 1 to allow the fuel discharge part 1 to smoothly enter and exit from the filler neck 31.

The upper portion of the retainer 50 may be configured such that the upper end of the retainer 50 has a maximum outer diameter sufficiently large to be pressed into the upper portion of the filler neck 31. Therefore, when the retainer 50 is mounted in the filler neck 31, the upper end of the retainer 50 may be hermetically pressed against the inner circumferential surface of the filler neck 31 in the circumferential direction of the filler neck 31.

When the retainer 50 is mounted in the filler neck 31, the upper end of the retainer 50 may be disposed close to the upper end of the filler neck 31 (i.e., a fuel injection hole 31a), and the lower end of the retainer 50 may be deposed under the upper end of the leveling pipe 40 connected to the filler neck 31.

Further, the lower portion of the retainer 50 may be provided with a fuel gun engagement protrusion 54 with which the end of the fuel discharge part 1 is engaged. The fuel gun engagement protrusion 54 may be formed on the inner circumferential of the retainer 50 to protrude inwards in the radial direction of the retainer 50. The fuel gun engagement protrusion 54 may be provided at the lower end of the retainer 50.

The fuel discharge part 1 of the fuel gun may be inserted into the retainer 50 until the end of the fuel discharge part 1 is engaged with the fuel gun engagement protrusion 54.

Further, external air intake holes 51 and evaporation gas venting holes 52 are formed in the upper portion of the retainer 50, and an opening 53 is formed in the lower portion of the retainer 50, based on a fuel injection direction and a fuel gun insertion direction into the filler neck 31.

The external air intake holes 51 are formed in the retainer 50 to draw external air into a space between the inner circumferential surface of the filler neck 31 and the outer circumferential surface of the retainer 50.

The external air flowing into the retainer 50 though the fuel injection hole 31a of the filler neck 31 may flow into the space between the filler neck 31 and the retainer 50 through the external air intake holes 51.

The evaporation gas venting holes 52 are formed in the retainer 50 to discharge the fuel evaporation gas, discharged to the space between the filler neck 31 and the retainer 50 through the leveling pipe 40, to the outside.

The fuel evaporation gas discharged to the space between the filler neck 31 and the retainer 50 through the leveling pipe 40 may be discharged to the outside of the filler neck 31 through the evaporation gas venting holes 52 and the fuel injection hole 31a.

Here, the external air intake holes 51 and the evaporation gas venting holes 52 may be disposed at positions facing each other in the circumferential direction of the retainer 50, in order to prevent mixing of the external air and the fuel evaporation gas as far as possible.

Concretely, a plurality of external air intake holes 51 and a plurality of evaporation gas venting holes 52 may be provided in the upper portion of the retainer 50. Here, the external air intake holes 51 may be spaced apart from each other in the circumferential direction of the retainer 50, and the evaporation gas venting holes 52 may also be spaced apart from each other in the circumferential direction of the retainer 50.

The opening 53 may serve to open the venturi port 2 of the fuel discharge part 1 inserted into the filler neck 31 and the retainer 50, and be formed by opening one side of the lower portion of the retainer 50 in the circumferential direction.

Therefore, the venturi port 2 may be disposed at a position facing the opening 53 of the retainer 50 when the fuel discharge part 1 is inserted into the retainer 50. In more detail, the opening 53 is disposed at the outside of the fuel discharge part 1 inserted into the lower portion of the retainer 50, thus being capable of opening the venturi port 2 of the fuel discharge part 1.

For example, when the fuel discharge part 1 is inserted into the retainer 50 until it reaches the fuel gun engagement protrusion 54 of the retainer 50, the venturi port 2 may be located at a position facing the opening 53.

The opening 53 may be disposed under the external air intake holes 51, and communicate with the external air intake holes 51 such that fluid flows therebetween. For example, the external air intake holes 51 and the opening 53 may be arranged in a row in the insertion direction of the fuel discharge part 1 into the retainer 50.

Air introduced into the space between the retainer 50 and the filler neck 31 through the external air intake holes 51 may be drawn into the fuel gun through the venturi port 2 of the fuel discharge part 1 opened through the opening 53.

Further, in order to prevent the fuel evaporation gas introduced into the filler neck 31 from being drawn into the venturi port connection pipe 3 through the venturi port, the partition 60 is provided on the outer circumferential surface of the retainer 50.

The partition 60 divides the space between the inner circumferential surface of the filler neck 31 and the outer circumferential surface of the retainer 50 into a first space S1 and a second space S2, and may be disposed on the outer circumferential surface of the retainer 50 to surround a space around the external air intake holes 51 and the opening 53.

That is, the partition 60 may be configured to surround the first space S1 which connects the external air intake holes 51 and the opening 53 such that fluid may flow therebetween, among the space between the filler neck 31 and the retainer 50.

The first space S1 is a space which communicates with the external air intake holes 51 and the opening 53 such that fluid may flow therebetween, and the second space S2 is a space which communicates with the evaporation gas venting holes 52 such that fluid may flow therebetween. The first space S1 and the second space S2 may be independent spaces which are divided from each other by the partition 60 and an early shut-off prevention valve 70.

As shown in FIGS. 2 to 4, in order to inhibit or prevent the fuel evaporation gas from contacting the venturi port 2, the partition 60 may be provided to seal the first space S1. For example, the edge of the partition 60 may be fixed to the outer circumferential surface of the retainer 50 to hermetically seal the first space S1.

In one form, the partition 60 is configured to seal the first space S1 other than a fuel intake hole 61 provided in the lower end thereof.

The partition 60 has the fuel intake hole 61 to seal the first space S1 before the fuel tank 10 is fully filled and to open the first space S1 when the fuel tank 10 is fully filled.

The fuel intake hole 61 is formed in a manner of opening the lower end of the partition 60 to draw the fuel into the first space S1 therethrough.

When the fuel in the fuel tank 10, flowing backwards to the filler neck 31, flows into the first space S1 through the fuel intake hole 61, the fuel comes into contact with the venturi port 2 of the fuel gun and thus closes the venturi port 2.

In another form, the partition 60 may include a first side wall 63 and a second side wall 64 which extend from the outer circumferential surface of the retainer 50 in the radial direction, and an outer wall 65 which integrally connects the first side wall 63 and the second side wall 64. When the retainer 50 is mounted in the filler neck 31, the outer wall 65 may be pressed against the inner circumferential surface of the filler neck 31.

The first side wall 63 and the second side wall 64 may be disposed to be spaced apart from each other by a designated distance in the circumferential direction of the retainer 50. Further, the outer wall 65 may be disposed at the ends of the first side wall 63 and the second side wall 64 in the radial direction of the retainer 50.

In order to open and close the fuel intake hole 61, the early shut-off prevention valve 70 may be disposed in the partition 60.

The early shut-off prevention valve 70 serves to close the fuel intake hole 61 before the fuel tank 10 is fully filled and to open the fuel intake hole 61 when the fuel tank 10 is fully filled.

The early shut-off prevention valve 70 may be mounted in the partition 60 to be disposed in the first space S1 in the state in which the early shut-off prevention valve 70 contacts both the inner circumferential surface of the partition 60 and the outer circumferential surface of the retainer 50.

The early shut-off prevention valve 70 may maintain the hermetically sealed state of the fuel intake hole 61 using a spring member 80.

The spring member 80 serves to press the early shut-off prevention valve 70 towards the fuel intake hole 61, and may press the early shut-off prevention valve 70 towards the fuel intake hole 61 due to the elastic restoring force thereof generated when the spring member 80 is compressed.

For this purpose, the spring member 80 which is mounted on a spring support plate 66 may be disposed on the early shut-off prevention valve 70. That is, the spring member 80 mounted on the spring support plate 66 may be disposed between the spring support plate 66 and the early shut-off prevention valve. In more detail, the upper end of the spring member 80 may be installed on the spring support plate 66, and the lower end of the spring member 80 may be installed on the early shut-off prevention valve 70.

The spring support plate 66 may be mounted on the inner circumferential surface of the outer wall 65 of the partition 60 or be mounted on the outer circumferential surface of the retainer 50. Here, the spring support plate 66 may be formed of a plate member having a smaller cross-sectional area than the cross-sectional area of the first space S1 based on a position at which the spring support plate 66 is disposed, or be formed of a plate member having an opening formed in the center thereof, so that fluid may flow between the external air intake holes 51 and the opening 53 in the first space S1.

Further, a valve engagement protrusion 62 configured to support the early shut-off prevention valve 70 may be provided at the lower end of the partition 60. The valve engagement protrusion 62 may be disposed at the outer side of the fuel intake hole 61, and support the lower end of the early shut-off prevention valve 70 pressed by the spring member 80 and thus prevent the early shut-off prevention valve 70 from being separated from the first space S1.

The spring member 80 maintains the early shut-off prevention valve 70 in the state of closing the fuel intake hole 61 of the partition 60 before the fuel tank 10 is fully filled. That is, before the spring member 80 is compressed by the pressure of the fuel flowing backwards from the fuel tank 10, the spring member 80 presses the early shut-off prevention valve 70 against the valve engagement protrusion 62 so that the early shut-off prevention valve 70 maintains the state of closing the fuel intake hole 61.

The early shut-off prevention valve 70 maintains the state of closing the fuel intake hole 61 of the partition 60 using the spring member 80 before the fuel tank 10 is fully filled, as shown in FIGS. 5 and 6, and opens the fuel intake hole 61 due to the fuel flowing backwards to the filler neck 31 from the fuel tank 10 when the fuel tank 10 is fully filled, as shown in FIG. 7.

That is, when the early shut-off prevention valve 70 is pressed upwards by the fuel flowing backwards to the filler neck 31 from the fuel tank 10 when the fuel tank 10 is fully filled, the spring member 80 is compressed and thus allows the early shut-off prevention valve 70 to open the fuel intake hole 61.

FIGS. 5 to 7 illustrate the respective operating states of the apparatus having the above configuration and flow of fluid in the apparatus. FIG. 5 is a view illustrating the operating state of the apparatus when the fuel tank is being filled with the fuel under room-temperature conditions, FIG. 6 is a view illustrating the operating state of the apparatus when the fuel tank is being filled with the fuel under high-temperature conditions, and FIG. 7 is a view illustrating the operating state of the apparatus when the fuel tank is fully filled with the fuel.

When the external temperature of the fuel tank 10 is room temperature, as shown in FIG. 5, the early shut-off prevention valve 70 closes the fuel intake hole 61 of the partition 60, and fluid in the filler neck 31 is not capable of flowing into the first space S1. The fluid may be fuel evaporation gas.

When the fuel discharge part 1 of the fuel gun is inserted into the retainer 50, the venturi port 2 of the fuel discharge part 1 is exposed to the first space S1 through the opening 53 of the retainer 50.

When the fuel discharge part 1 discharges the fuel to the filler neck 31, negative pressure is generated in the fuel gun and thus the fuel gun draws air through the venturi port 2, and as the air in the first space S1 is drawn into the fuel gun, external air outside the filler neck 31 is drawn into the first space S1 through the external air intake holes 51.

The fuel evaporation gas, generated in the fuel tank 10 when the fuel is injected into the fuel tank 10, is discharged to the filler neck 31 through the leveling pipe 40, passes through the second space S2 of the filler neck 31 and the evaporation gas venting holes 52 of the retainer 50, and is discharged to the outside of the filler neck 31.

Here, the first space S1 is divided from the second space S2 by the partition 60 and the early shut-off prevention valve 70, and thus, the venturi port 2 does not draw in the fuel evaporation gas.

On the other hand, when the external temperature of the fuel tank 10 is a high temperature, as shown in FIG. 6, the early shut-off prevention valve 70 maintains the state of closing the fuel intake hole 61 of the partition 60, and the first space S1 maintains the state in which fluid in the filler neck 31 is not capable of flowing into the first space S1.

When the fuel discharge part 1 of the fuel gun is inserted into the retainer 50, the venturi port 2 is exposed to the first space S1 through the opening 53 of the retainer 50.

When the fuel discharge part 1 discharges the fuel to the filler neck 31, negative pressure is generated in the fuel gun and thus the fuel gun draws air in the first space S1 through the venturi port 2, and as the air in the first space S1 is drawn into the fuel gun, external air outside the filler neck 31 is drawn into the first space S1 through the external air intake holes 51.

The fuel evaporation gas, generated in the fuel tank 10 when the fuel is injected into the fuel tank 10, is discharged to the filler neck 31 through the leveling pipe 40, and is discharged to the outside of the filler neck 31 through the second space S2 and the evaporation gas venting holes 52 to the outside of the filler neck 31.

When the external temperature is high, a much larger amount of the fuel evaporation gas may be generated in the fuel tank 10 than when the external temperature is room temperature and an excessive amount of the fuel evaporation gas is discharged to the filler neck 31 through the leveling pipe 40, but the first space S1 is divided from the second space S2 by the partition 60 and the early shut-off prevention valve 70 and thus the venturi port 2 of the fuel gun does not contact the fuel evaporation gas.

Therefore, fuel filling may be performed normally until the fuel tank 10 is fully filled with the fuel without causing early shut-off of the fuel gun.

When the fuel tank 10 is fully filled, as shown in FIG. 7, the fuel in the fuel tank 10 flows backwards to the filler neck 31. The fuel flowing backwards to the filler neck 31 presses the early shut-off prevention valve 70 upwards through the fuel intake hole 61 of the partition 60. Here, the early shut-off prevention valve 70 is pushed upwards by the fuel and compresses the spring member 80, and thereby the fuel intake hole 61 is opened.

The fuel flowing into the first space S1 through the fuel intake hole 61 comes into contact with the venturi port 2 and closes the venturi port 2, and thereby, the fuel gun is shut off without releasing the negative pressure generated therein and thus stops discharge of the fuel.

Here, the early shut-off prevention valve 70 may prevent the fuel flowing backwards to the filler neck 31 from flowing to the outside of the filler neck 31 through the external air intake holes 51. For this purpose, the early shut-off prevention valve 79 may be formed of a plate-type member or a block-type member having a cross-sectional area corresponding to the cross-sectional area of the first space S1.

As such, the apparatus according to the present disclosure facilitates normal operation of the fuel gun until the fuel tank 10 is fully filled with the fuel, regardless external temperature conditions of the fuel tank 10. Accordingly, the apparatus according to the present disclosure may inhibit or prevent early shut-off of the fuel gun before the fuel tank 10 is fully filled with the fuel while refueling.

As is apparent from the above description, an apparatus for controlling shut-off of a fuel gun in a filler pipe of a fuel tank facilitates normal operation of the fuel gun until the fuel tank is fully filled with fuel, regardless external temperature conditions of the fuel tank. Accordingly, the apparatus according to the present disclosure may prevent early shut-off of the fuel gun before the fuel tank is fully filled with the fuel while refueling.

The present disclosure has been described in detail with reference to forms thereof. However, it will be appreciated by those skilled in the art that changes may be made in these forms without departing from the principles and spirit of the present disclosure.

What is claimed is:
1. An apparatus for controlling shut-off of a fuel gun in a filler pipe of a fuel tank, the apparatus comprising:
   a retainer mounted in a filler neck of the fuel tank, and including:
      external air intake holes configured to draw external air,
      evaporation gas venting holes configured to discharge fuel evaporation gas, wherein the external air intake holes and the evaporation gas venting holes are formed in an upper portion of the retainer in a fuel injection direction of the filler neck, and
      an opening formed in a lower portion of the retainer, disposed outside a fuel discharge part of the fuel gun inserted into the filler neck, and configured to fluidly communicate with the external air intake holes and open a venturi port of the fuel discharge part;
   a partition disposed in a space between an inner circumferential surface of the filler neck and an outer circumferential surface of the retainer and having a fuel intake hole formed in a lower end of the partition, wherein the partition is configured to define a first space where the opening and the external air intake holes are fluidly communicate to each other; and an early shut-off prevention valve disposed in the partition and configured to:
- close the fuel intake hole before the fuel tank is fully filled with fuel, and
- open the fuel intake hole by fuel flowing to the filler neck from the fuel tank when the fuel tank is fully filled with the fuel.

2. The apparatus of claim 1, wherein the partition divides the space between the inner circumferential surface of the filler neck and the outer circumferential surface of the retainer into the first space and a second space, and the second space is configured to communicate with the evaporation gas venting holes such that the fluid flows therebetween.

3. The apparatus of claim 1, wherein the partition is configured to seal the first space other than the fuel intake hole.

4. The apparatus of claim 1, further comprising:
- a spring support plate mounted on an inner circumferential surface of the partition; and
- a spring member configured to press the early shut-off prevention valve towards the fuel intake hole and disposed between the spring support plate and the early shut-off prevention valve.

5. The apparatus of claim 4, wherein a valve engagement protrusion configured to support the early shut-off prevention valve is provided at a lower end of the partition.

6. The apparatus of claim 5, wherein the spring member is configured to press the early shut-off prevention valve against the valve engagement protrusion to maintain a state in which the early shut-off prevention valve closes the fuel intake hole before the spring member is compressed by the fuel flowing backwards from the fuel tank when the fuel tank is fully filled with the fuel.

7. The apparatus of claim 4, wherein the spring member is compressed by the fuel flowing into the filler neck from the fuel tank when the fuel tank is fully filled with the fuel, and thus allows the early shut-off prevention valve to open the fuel intake hole.

8. The apparatus of claim 1, wherein the external air intake holes and the evaporation gas venting holes are disposed to face each other in a circumferential direction of the retainer.

9. The apparatus of claim 1, wherein the retainer is mounted in the filler neck such that an upper end of the retainer is hermetically pressed against the inner circumferential surface of the filler neck.

10. The apparatus of claim 1, wherein the retainer has a fuel gun engagement protrusion provided at a lower end thereof, and the venturi port of the fuel discharge part faces the opening of the retainer when an end of the fuel discharge part of the fuel gun comes into contact with the fuel gun engagement protrusion.

11. The apparatus of claim 1, wherein:
- the fuel tank has a leveling pipe configured to discharge the fuel evaporation gas in the fuel tank to the filler neck while refueling, and
- an end of the leveling pipe is disposed in the fuel tank and comes into contact with a surface of the fuel to be closed when the fuel tank is fully filled with the fuel.

12. The apparatus of claim 1, wherein the fuel discharge part of the fuel gun is configured to draw air through the venturi port when the fuel gun discharges the fuel.

13. The apparatus of claim 12, wherein the fuel discharge part of the fuel gun is configured to stop discharge of the fuel, when the venturi port is closed by the fuel flowing into the filler neck from the fuel tank.

* * * * *